United States Patent
Dhayalkar et al.

(10) Patent No.: US 12,547,183 B2
(45) Date of Patent: Feb. 10, 2026

(54) SYSTEMS AND METHODS FOR DETECTING, MAPPING, AND ROUTE PLANNING AROUND CLIFFS FOR ROBOTIC DEVICES

(71) Applicant: Brain Corporation, San Diego, CA (US)

(72) Inventors: Sahil Rajesh Dhayalkar, San Diego, CA (US); Peter O'Connor, San Diego, CA (US); Kirill A. Pirozhenko, San Diego, CA (US); Charles-Alban Bruno Sylvain Deledall, San Diego, CA (US)

(73) Assignee: Brain Corporation, San Diego, CA (US)

( * ) Notice: Subject to any disclaimer, the term of this patent is extended or adjusted under 35 U.S.C. 154(b) by 16 days.

(21) Appl. No.: 18/787,456

(22) Filed: Jul. 29, 2024

(65) Prior Publication Data

US 2025/0036133 A1   Jan. 30, 2025

Related U.S. Application Data

(60) Provisional application No. 63/529,248, filed on Jul. 27, 2023.

(51) Int. Cl.
*G05D 1/622* (2024.01)
*G05D 1/242* (2024.01)
*G05D 1/246* (2024.01)

(52) U.S. Cl.
CPC .......... *G05D 1/2462* (2024.01); *G05D 1/242* (2024.01); *G05D 1/622* (2024.01)

(58) Field of Classification Search
CPC ....... G05D 1/2462; G05D 1/242; G05D 1/622
See application file for complete search history.

*Primary Examiner* — Mathew Franklin Gordon
(74) *Attorney, Agent, or Firm* — Sidharth Kapoor; Pierson Ferdinand LLP

(57) ABSTRACT

Systems and methods for detecting, mapping, and route planning around cliffs for robotic devices are disclosed herein. According to at least one non-limiting exemplary embodiment, a robot processing a three-dimensional range sensor scan may utilize pre-computed neighboring points to detect cliffs, navigable ramps, and holes in a plane of a map used by the robotic device to navigate.

20 Claims, 9 Drawing Sheets

SYSTEMS AND METHODS FOR DETECTING, MAPPING, AND ROUTE PLANNING AROUND CLIFFS FOR ROBOTIC DEVICES

PRIORITY

This application claims the benefit of U.S. Provisional Patent Application Ser. No. 63/529,248 filed on Jul. 27, 2023 under 35 U.S.C. § 119, the entire disclosure of which is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for detecting, mapping, and route planning around cliffs for robotic devices.

SUMMARY

The foregoing needs are satisfied by the present disclosure, which provides for, inter alia, systems and methods for detecting, mapping, and route planning around cliffs for robotic devices.

Exemplary embodiments described herein have innovative features, no single one of which is indispensable or solely responsible for their desirable attributes. Without limiting the scope of the claims, some of the advantageous features will now be summarized. One skilled in the art would appreciate that as used herein, the term robot may generally be referred to autonomous vehicle or object that travels a route, executes a task, or otherwise moves automatically upon executing or processing computer readable instructions.

According to at least one non-limiting exemplary embodiment, a robotic system is disclosed. The robotic system, comprises: a three-dimensional ("3D") range sensor; a memory comprising a plurality of computer readable instructions stored thereon; and at least one controller configured to execute the computer readable instructions to: receive a range measurement from the 3D range sensor, the range measurement comprises a plurality of points, each of the plurality of points comprises at least one neighboring point; determine, for each point of the plurality of points, that one or more of the points correspond to a cliff based upon at least one of: (i) a magnitude of a vertical difference between the point and the at least one neighboring point being greater than a first value, and (ii) a magnitude of a vertical slope between the point and the at least one neighboring point is greater than a second value; and rasterize each point determined to represent the cliff into a pixel on a map to cause the robotic system to avoid the pixels on the map representing the cliff.

According to at least one non-limiting exemplary embodiment, the plurality of points comprise a subset of all points generated by the 3D range sensor, and the subset corresponds to a portion of all points generated by beams of the 3D range sensor which are below a horizon.

According to at least one non-limiting exemplary embodiment, the at least one neighboring point for each of the plurality of points is pre-computed prior to the controller receiving the range measurement.

According to at least one non-limiting exemplary embodiment, the controller is further configured to execute the computer readable instructions to: determine, for each point of the plurality of points, that one or more of the plurality of points correspond to at least one hole if the point is below a third value, the third value corresponds to a height below a plane of the map; back-project the hole points along a path of a beam used to localize the corresponding hole points, the back projection goes until a point where the beam intersects the map plane; and rasterize the back-projected hole point as a pixel on the map, the pixel on the map is at the point where the beam intersects the map plane, wherein the hole pixel prevents navigation thereon by the robotic system.

According to at least one non-limiting exemplary embodiment, the controller is further configured to execute the computer readable instructions to determine pixels which lie between a given point and the 3D range sensor; and rasterize the pixels which lie between the given point and the 3D range sensor as free space, wherein the rasterizing configures the robotic system to plan a path therein.

According to at least one non-limiting exemplary embodiment, the controller is further configured to execute the computer readable instructions to determine, for each point of the plurality of points, that one or more of the points correspond to a navigable ramp based upon (i) the magnitude of a vertical difference between the point and the at least one neighboring point being less than the first value, and (ii) the magnitude of the vertical slope between the point and the at least one neighboring point is less than the second value; and rasterize each point determined to represent the navigable ramp as a ramp pixel on the map, wherein the rasterizing configures the robotic system to permit navigation thereon.

According to at least one non-limiting exemplary embodiment, the controller is further configured to execute the computer readable instructions to apply a transformation to data from the 3D range sensor based upon the vertical slope of the ramp when navigating the robotic system onto the ramp.

According to at least one non-limiting exemplary embodiment, a method for navigating a robotic system is disclosed. The method, comprising receiving, via a controller of the robotic system, a range measurement from a three-dimensional ("3D") range sensor, the range measurement comprises of a plurality of points, each of the plurality of points comprises at least one neighboring point; determine, for each point of the plurality of points, that one or more of the points corresponds to a cliff based upon at least one of: (i) a magnitude of a vertical difference between the point and the at least one neighboring point being greater than a first value, and (ii) a magnitude of a vertical slope between the point and the at least one neighboring point is greater than a second value; and rasterize each point determined to represent the cliff into a pixel on a map to cause the robotic system to avoid the pixels on the map representing the cliff.

According to at least one non-limiting exemplary embodiment, a non-transitory computer readable medium comprising computer readable instruction stored thereon is disclosed. The instructions, when executed by at least one controller of a robotic system, configure the at least one controller to receive a range measurement from a three-dimensional ("3D") range sensor, the range measurement comprises of a plurality of points, each of the plurality of points comprises at least one neighboring point; determine, for each point of the plurality of points, that one or more of the points correspond to a cliff based upon at least one of (i) a magnitude of a vertical difference between the point and the at least one neighboring point being greater than a first value, and (ii) a magnitude of a vertical slope between the point and the at least one neighboring point is greater than a second value; and rasterize each point determined to represent the cliff into a pixel on a map to cause the robotic system to avoid the pixels on the map representing the cliff.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1A:
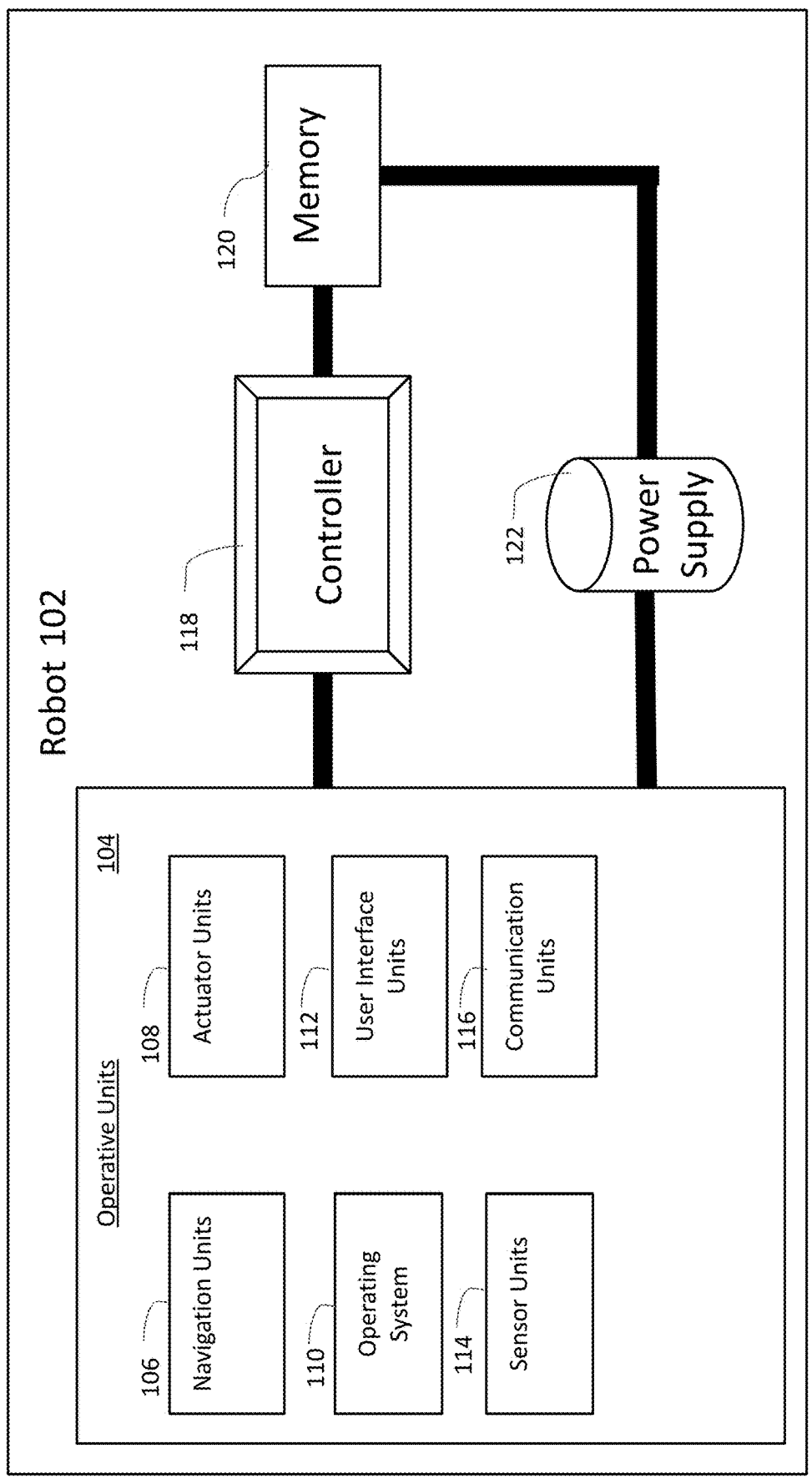
FIG. 1A is a functional block diagram of a robot in accordance with some embodiments of this disclosure.

All Figures disclosed herein are © Copyright 2023 Brain Corporation. All rights reserved.

DETAILED DESCRIPTION

Currently, robots operate in various environments containing a plurality of hazards. The most common hazards are objects, be they dynamic or static, and cliffs, such as sharp drops, steps, or other falls which are dangerous for a robot to navigate over. Cliffs pose a unique hazard to robots as the robot must respond quickly to a detection of a cliff before a portion of the robot 102 is moved over the ledge. This may cause the robot to become stuck or worse, fall over the ledge and potentially damage itself, property, and injure nearby people. Many robots have recently adapted three dimensional scanning light detection and ranging ("LiDAR") sensors which have the benefit of a larger perceptive field while having additional physical considerations and much more processing and memory per scan than traditional 2-dimensional LiDAR and/or time of flight ("ToF") cameras. Accordingly, there is a need in the art for a light-weight processing pipeline for constructing robot usable maps from 3-dimensional range sensors which is also capable of rapidly responding to cliffs.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for detecting, mapping, and route planning around cliffs for robotic devices. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, various semantic labels will be provided to denote certain states or values of a pixel for a map. It is appreciated that the semantics chosen for this disclosure are in no way intended to limit map construction to only these semantic labels. For example, pixels of a map which are unsensed will be referred to herein as "unknown" pixels, other implementations may apply different semantics such as "unsensed" or "no data". In practice, the semantics used herein are representative of digital encoding of these states in a digital medium (e.g., unknown pixels could be 00, objects 01, etc.).

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, 4G, or 5G including LTE/LTE-A/TD-LTE/TD-LTE, GSM, etc. variants thereof), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) enable robotic detection of cliffs and ledges without excluding floors at other heights from being navigable; (ii) enables robotic motion around black and/or specular surfaces; (iii) minimizes memory and processor bandwidth needed to process and map a 3D range measurement; and (iv) enhance robotic perception by optimizing the use of a 3D range sensor for a wider perceptive field. Other advantages are readily discernable by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processing devices (e.g., microprocessing devices) and other peripherals. As previously mentioned and used herein, processing device, microprocessing device, and/or digital processing device may include any type of digital processing device such as, without limitation, digital signal processing devices ("DSPs"), reduced instruction set computers ("RISC"), complex instruction set computers ("CISC"), microprocessing devices, gate arrays (e.g., field programmable gate arrays ("FPGAs")), programmable logic device ("PLDs"), reconfigurable computer fabrics ("RCFs"), array processing devices, secure microprocessing devices and application-specific integrated circuits ("ASICs"). Peripherals may include hardware accelerators configured to perform a specific function using hardware elements such as, without limitation, encryption/description hardware, algebraic processing devices (e.g., tensor processing units, quadratic problem solvers, multipliers, etc.), data compressors, encoders, arithmetic logic units ("ALU"), and the like. Such digital processing devices may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide computer-readable instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the computer-readable instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processing device may be internal to or on board robot 102 and/or may be external to robot 102 and be communicatively coupled to controller 118 of robot 102 utilizing communication units 116 wherein the external processing device may receive data from robot 102, process the data, and transmit computer-readable instructions back to controller 118. In at least one non-limiting exemplary embodiment, the processing device may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processing devices. In some embodiments, a single controller (e.g., controller 118) may serve as the various controllers and/or processing devices described. In other embodiments different controllers and/or processing devices may be used, such as controllers and/or processing devices used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units such as specifically configured task units (not shown) that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magneto strictive elements, gesticulation, and/or any way of driving an actuator known in the art. By way of illustration, such actuators may actuate the wheels for robot 102 to navigate a route; navigate around obstacles; rotate cameras and sensors. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

Actuator unit 108 may also include any system used for actuating and, in some cases actuating task units to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("ToF") cameras, structured light cameras, etc.), antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, sensor units 114 may be in part external to the robot 102 and coupled to communications units 116. For example, a security camera within an environment of a robot 102 may provide a controller 118 of the robot 102 with a video feed via wired or wireless communication channel(s). In some instances, sensor units 114 may include sensors configured to detect a presence of an object at a location such as, for example without limitation, a pressure or motion sensor may be disposed at a shopping cart storage location of a grocery store, wherein the controller 118 of the robot 102 may utilize data from the pressure or motion sensor to determine if the robot 102 should retrieve more shopping carts for customers.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3.5G, 3.75G, 3GPP/3GPP2/HSPA+), 4G (4GPP/4GPP2/LTE/LTE-TDD/LTE-FDD), 5G (5GPP/5GPP2), or 5G LTE (long-term evolution, and variants thereof including LTE-A, LTE-U, LTE-A Pro, etc.), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), Fire Wire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processing device, or robot performing a task, operation or transformation illustrated in the figures below comprises a controller executing computer readable instructions stored on a non-transitory computer readable storage apparatus, such as memory 120, as would be appreciated by one skilled in the art.

Figure 1B:
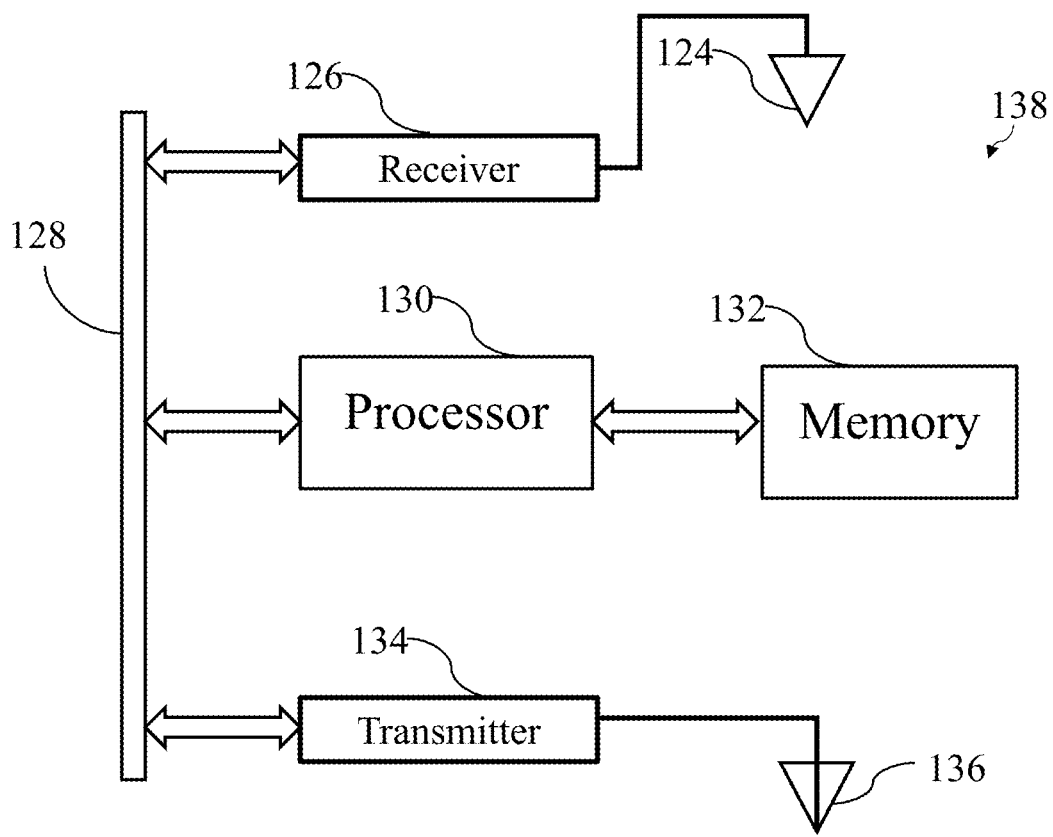
FIG. 1B is a functional block diagram of a controller or processor in accordance with some embodiments of this disclosure.

Next referring to FIG. 1B, the architecture of a processor or processing device 138 is illustrated according to an exemplary embodiment. As illustrated in FIG. 1B, the processing device 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132 which stores computer code or computer readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components-receiver, processor, and transmitter—in the processing device. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may illustrate an external server architecture configurable to effectuate the control of a robotic apparatus from a remote location, such as server 202 illustrated next in FIG. 2. That is, the server may also include a data bus, a receiver, a transmitter, a processor, and a memory that stores specialized computer readable instructions thereon.

One of ordinary skill in the art would appreciate that a controller 118 of a robot 102 may include one or more processing devices 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer readable instructions to perform a function may include one or more processing devices 138 thereof executing computer readable instructions and, in some instances, the use of any hardware peripherals known within the art. Controller 118 may be illustrative of various processing devices 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processing devices 138 for performing high level tasks (e.g., planning a route to avoid obstacles) and processing devices 138 for performing low-level tasks (e.g., producing actuator signals in accordance with the route).

Figure 2A:
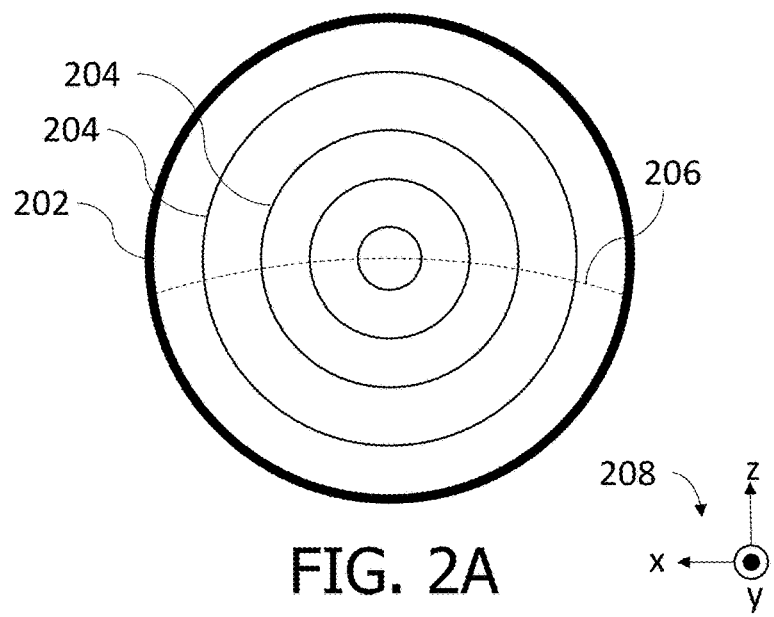
FIG. 2A is a front-facing view of a three-dimensional range sensor in accordance with some embodiments of this disclosure.

FIG. 2A is a front-facing view of a three-dimensional ("3D") ranging sensor 202 in accordance with exemplary embodiments of this disclosure. 3D ranging sensors, also known as light detection and ranging ("LiDAR") sensors, as discussed herein include two or more measurement planes, shown by rings 204. In some embodiments, a spinning mirror (not shown) is disposed in the center of the 3D ranging sensor 202 and two or more laser beams are reflected off the mirror and into the environment. In the illustrated embodiment, four rings 204 are depicted corresponding to four laser beams being reflected off the central mirror and emitted into the environment. These signals reflect off objects in the environment and a time of flight between their emission from the sensor (at a known angle based on the position of the mirror) and when they are reflected back to a detector of the sensor 202 is measured, wherein the time of flight yields a range along the angle of emission. By taking the product of the range and the angle of emission, a point in 3D space is generated for each sample of the reflected signal. The direction of the emitted beams approximately correspond to surface normal vectors of a sphere, wherein many 3D range sensors include spherical lenses.

According to at least one non-limiting exemplary embodiment, 3D range sensors may include structured light sensors configured to emit a pattern of light onto an environment and determine ranges based on deformations to the projected shape. It will be appreciated that structured light sensors are not necessarily precluded from use with the present systems and methods, but not all structured light sensors generate points. Structured light sensors which do generate 3D points, however, are applicable with the present disclosure.

According to at least one non-limiting exemplary embodiment, 3D range sensors may include depth cameras. Depth cameras differ from the aforementioned embodiment in that, rather than utilizing a spinning mirror/laser, depth cameras produce singular 'flashes' or pulses of light which sample ranges across a plurality of angles. The plurality of angles comprises at least two orthogonal dimensions (e.g., up/down and left/right). The emissions from 3D depth cameras tend to be of limited field of view as compared to typical 3D spinning LiDAR sensors and thus limit the perceptive field available to the robot. However, other factors such as cost and robot form factors may necessitate the use of these sensors, which are still compatible with the present systems and methods.

As used herein, coordinate frame 208 is a Cartesian frame which will be consistent throughout all figures herein. The coordinate frame 208 is defined by having, in FIG. 2A, a positive y-axis extending outward from the page from the center of the sensor 202, a positive x-axis to the left of the page, and a z-axis upwards along the page following the right-hand-rule convention. The positive z-axis herein will always point upwards and normal to the floor in later embodiments involving the sensor 202 affixed to a robot. It is appreciated that the coordinate frame 208 is only depicted for illustrative and descriptive clarity, wherein data from a 3D LiDAR could be processed in any coordinate frame, such as spherical, polar, etc.

Figure 2B:
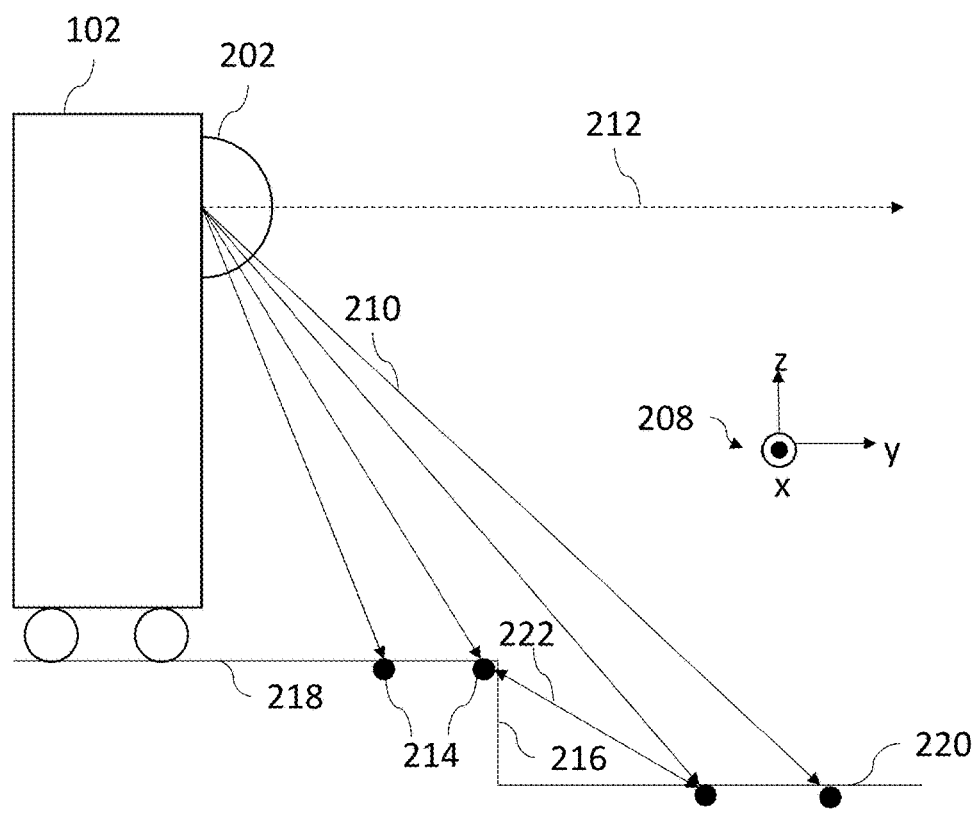
FIG. 2B depicts a robot encountering a cliff and collecting a 3-dimensional range measurement, according to an exemplary embodiment.

Further depicted on FIG. 2A is horizon line 206. The sensor 202 in this embodiment is mounted as depicted in FIG. 2B as being on a side of robot 102. The mounting of the sensor 202 on the robot 102 is such that the point of the perimeter of the sensor 202 in FIG. 2A is closest to the floor is at the bottom of the image, and the highest point of circle 202 in FIG. 2A is closest to the ceiling (i.e., farthest from the floor the robot 102 is navigating upon). The horizon line 206 indicates which beams emitted from sensor 204 could sense a floor, assuming the floor is infinitely large and always flat and beams travel infinite distance. To better visualize how the horizon line 204 is determined, FIG. 2B depicts the sensor 202 mounted onto a robot and detecting a floor comprising a cliff 216 via a plurality of beams 210, according to an exemplary embodiment. Beams emitted from the sensor 202 which are emitted at or above the normal beam 212 (which is parallel to the floor) will never reach the floor. Accordingly, the horizon line 206 is defined by all beams 210 which will, eventually, reach the floor the robot 102 is navigating upon if the robot 102 were upon an infinitely large and flat floor.

Although illustrated under ideal circumstances wherein the sensor 202 is assumed to have infinite range, in practice the horizon line 206 may be lower than as defined above due to physical and software considerations. According to at least one non-limiting exemplary embodiment, some beams may reach the floor well beyond the maximum range of the sensor, wherein the horizon line may be lowered to only consider beams which are incident on the infinitely large flat floor within the maximum range of the sensor 202. For example, a beam 210 may be 1° lower (i.e., clockwise about the sensor 202 in FIG. 2B) than beam 212 and eventually reach the floor hundreds of meters away from the robot 102 wherein returning signals would be undetectable by the sensor 202. Accordingly, in practical implementations, the horizon 206 may be lowered such that these beams 210 are above the horizon line 206 and not considered for the cliff detection and mapping methods disclosed herein. Additionally, in some embodiments, the robot 102 may only need concern itself with objects within a threshold range from itself for task performance despite the sensor 202 being capable of sensing objects beyond this range. For example, the sensor 202 may detect a point on an infinitely large and flat floor at a range of 30 meters using some beams 210, however if the robot 102 only plans its routes for the next 10 meters this information is not useful, adds computation time, and thus can be effectively considered as beyond the horizon. Accordingly, even though the beams 210 are incident on the floor and do generate returning signals, beams 210 which are incident upon the floor beyond this threshold range may also be filtered from the present systems and methods disclosed herein. In other words, the horizon line 206 may be lowered in the illustration. The horizon line 206 comprises an upside-down U shape curve shown in FIG. 2A due to the spherical nature of the 3D LiDAR 202. Accordingly, for the purposes of identifying cliffs, ramps, and other elevation changes in an otherwise flat floor, only beams 210 which are incident upon a (hypothetical infinitely large) flat floor will be considered, wherein beams above the horizon line 206 shown in FIG. 2A are not utilized to detect cliffs in accordance with the present disclosure.

It is appreciated that the horizon line 206 may be different depending on the position and orientation of the sensor 202 on the robot 102. For example, if the sensor 202 is aimed downward towards a floor such that its center point is aligned with the negative z-axis direction, the horizon line 206 may appear circular about the z-axis since these are the beams 210 that would be incident upon a flat floor. If the sensor 202 is mounted at an angle, the horizon line 206 may shift upward or downward (depending on the angle) in FIG. 2A. One may determine the horizon line 206 empirically for any given sensor 202 on a robot 102 by collecting a range measurement while the robot 102 is on a large flat floor, wherein all beams/points incident on the floor are therefore at or below the horizon 206. Alternatively, simulations may be performed using unit the vectors of the sensor 202 and simulating which beams 210 would be incident upon a flat floor, wherein the unit vectors generally correspond to surface normal vectors of a sphere.

Returning to FIG. 2B, robot 102 is traveling in the positive y direction (left to right) and, using its sensor 202, collects range measurements via beams 210, and others not shown, in front of itself. These range measurements may enable robot 102 to identify objects to navigate around an environment as well as to identify one or more cliffs 216. A cliff 216, as used herein, refers to a sharp and sudden change in elevation of an otherwise flat floor which is unnavigable, from a safety perspective, by the robot 102. Cliffs 216 are different from ramps in that ramps, as used herein, comprise gradual and sloped changes in elevation which are not sudden and therefore do not pose a safety hazard if the robot 102 navigates thereon. The precise difference between a cliff 216 and a ramp may be based upon the size/shape of the robot 102, its traction with the ground, and/or other parameters which impact the maximum slope the robot 102 is capable of navigating up and down. The difference between a cliff 216 and a ramp can be defined mathematically using tunable parameters discussed below. In terms of the behavior of robot 102, a robot 102 should never navigate over a cliff 216 but may navigate over a ramp, wherein it is essential to identify and resolve these different obstacles for effective navigation.

The robot 102 depicted is navigating proximate to the cliff 216 such that some beams 210 from the 3D range sensor 202 are incident upon the upper floor 218 and some on the lower floor 220. The robot 102 is navigating on the upper floor 218 and must avoid navigating over the cliff 216. Each of the beams 210 illustrated corresponds to a singular beam emitted along a discrete ring 204, such as those shown in FIG. 2A. The given scenario effectively depicts a 2-dimensional range sensor, wherein detecting cliffs along this singular illustrated slice of beams is rather trivial. Any beam 210 greater than an expected range for an otherwise flat floor, which can be a preprogrammed set of values, would indicate a cliff. However, this initial solution would indicate that the lower floor 220 is an obstacle to avoid, despite being navigable floor which could be accessible via ramps located elsewhere. Consider ray 222 which extends between a point 214 closest to the cliff 216 on the upper floor 218 and a point 214 closest to the cliff 216 on the lower floor 220. Only point 214 on the upper floor 218 should be marked as a cliff (i.e., a point to avoid under all circumstances) as it would prevent robot 102 from navigating over the cliff even if the point 214 beyond the cliff is marked as navigable floor, effectively creating a barrier between the cliff edge 216 and the other navigable floor. A different perspective of this scenario is shown and discussed in FIG. 3A, 3B, 4.

It is appreciated that the 3D range sensor 202 is detecting points 204 into and out of the page (i.e., along the x-axis of FIG. 2B) on the upper floor 218 and lower floor 220, where there is no guarantee the cliff 216 is positioned parallel to robot 102 as shown. For instance, the edge of the cliff 216 could be diagonally oriented with respect to robot 102. Accordingly, additional processing is required to identify not just points 214 on the lower floor, but also which points denote the closest navigable location to the cliff 216 in two dimensions (x, y). By identifying points closest to the cliff 216 edge using specialized map pixels (e.g., object or obstacle pixels to avoid), a barrier of these map pixels can be created on both edges of the cliff 216 closest thereto, effectively preventing the robot 102 from traveling over the cliff 216 while preserving both floors 218, 220 as being navigable space.

Figure 3A:
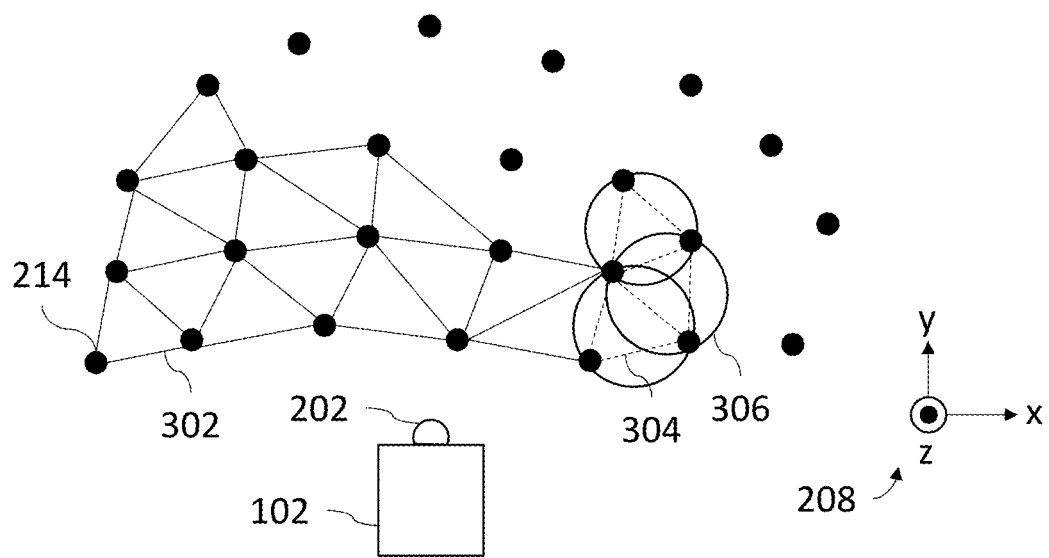
FIG. 3A is a top-down view depicting Delaunay triangulation used to pre-compute neighboring points for all points of a 3-dimensional range measurement, according to an exemplary embodiment.

FIG. 3A illustrates a top-down view of a robot 102, comprising a 3D ranging sensor 202, collecting a scan of the floor space in front of itself, according to an exemplary embodiment. Only points 214 which contact a floor (i.e., are emitted below horizon line 206) are illustrated. Other points 214 may be generated and utilized for mapping objects but, for the purposes of cliff detection, they are not considered for analysis as they would never be able to detect a cliff 216 in the floor.

Recall in FIG. 2B, as shown by ray 222, that a point 214 can used to identify as a cliff 216 based on the properties of adjacent neighboring points. Such properties may include distance and elevation changes. Accordingly, nearest neighboring points 214 should be determined for all points 214 of a scan from a 3D range sensor. The neighboring points 214 may be identified via, for example, a Delaunay triangulation process. Delaunay triangulation involves determining circumcircles 306 surrounding a triangle formed by three (and in some embodiments, four) points 214. Edges 302, which comprise a link between two points 214, are generated such that, for a given circumcircle 306 which are defined by a circle with a perimeter that coincides with any three (3) points 214, no other edges 302 other than the three edges corresponding to the three points 214 which define the circumcircle 306 lie therein. Other edges 302 may partially intersect with other circumcircles 306, however they may or may not be wholly encompassed.

Since 3D range sensors always emit beams 210 at discrete and predetermined angles, the edges 302 formed between neighboring points 214 may remain substantially static regardless of the environment. Accordingly, edges 302 may only need to be calculated once, although preferably recalculated on occasion to account for drift, bias, noise, and calibration changes in sensor 202. For example, the edges 302 may be calculated via Delaunay triangulation every time robot 102 powers on, wherein the robot 102 may capture a scan using the 3D range sensor 202 and, using points 214 of that scan, identify edges 302. In other words, the edges 302 should generally correctly identify nearest neighboring points 214 for the points 214 of the scan invariant of the geometry of the scene.

Figure 3B:
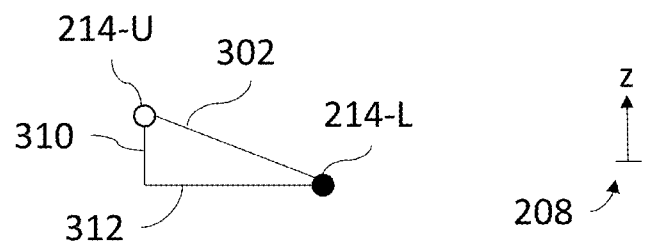
FIG. 3B is a side view of a pair of neighboring points being evaluated for cliff detection, according to an exemplary embodiment.

The scene depicted in FIG. 3A is a top-down view of a robot 102 with a 3D range sensor 202 collecting range measurements for a plurality of points 214. The points each contain an (x, y) position as shown and a height (z-axis), which from this perspective, cannot be shown. FIG. 3B depicts a side view of two points 214 with their associate height values, according to an exemplary embodiment. The two points 214 comprise an upper point 214-U and a lower point 214-L, with the z-value of the point 214-U being larger than the z-value of the point 214-L. Any pair of points 214 should have an upper and lower point 214-U. 214-L between the two of them, even if the difference in height is marginal. Only the z-axis components of the two points 214-U and 214-L are illustrated, wherein the points 214-U and 214-L could be connected along the x-axis, y-axis, or any angle between. The two points 214 may represent one of four things: an object, a flat floor, a ramp, or a cliff. A ramp, as used herein, includes any surface with a slope which is navigable by the robot 102, wherein sloped surfaces which are too steep for the robot 102 will be treated herein as equal to a cliff. Steep slopes pose the same risk as cliffs in that a robot 102 navigating over such obstacles would lose control and fall, potentially damaging robot 102, other nearby objects, or injuring people.

To determine if the two points 214-U and 214-L represent an object, the controller 118 may check that the z-height of either point 214-U, 214-L are above the current z-height of the robot 102. In some embodiments, the robot 102 navigates on a flat plane using a coordinate system where z=0 always corresponds to the height of the robot 102, wherein objects correspond to points 214 with z>0. It may be presumed herein for clarity of discussion that z=0 will define the floor plane unless otherwise specified. One skilled in the art may appreciate that other planes at different z-values may be utilized depending on the coordinate system employed by the robot 102.

When determining if the two points 214-U and 214-L represent a cliff, two scenarios could occur: (i) a sharp and large drop is present, or (ii) a ramp which is too steep to navigate is present. Both cases should be treated the same in that the robot 102 should be prevented from navigating therein. For the first case, the z-difference between the point 214-U and 214-L can be compared to a first, large threshold reflective of sharp drops (e.g., 0.1 m, 0.2 m, etc.). The exact magnitude of the first threshold may be based on the robot 102 form factor, namely its capabilities of maintaining traction on inclined surfaces which may further depend on height, mass distribution, wheel treads, and other form factors of the robot 102. Steep slopes can be detected based upon the slope of the edge 302 being within a threshold range, wherein the range includes a maximum smaller than the first threshold and represents the range of navigable inclinations for the robot 102 (also dependent on form factor). Additionally, in some exemplary non-limiting embodiments, the condition for a ramp further requires the difference in z-height between the two points 214-U and 214-L to be smaller than a specified ramp threshold, which is smaller than the first threshold.

Stated another way, presuming both points 214-U and 214-L have a z value equal to or less than zero, the two points 214-U and 214-L define a slope which could be a cliff or ramp. This slope, if larger than a prescribed threshold corresponding to the steepest slope the robot 102 is capable of navigating, would correspond to a cliff. If the slope is smaller than the steepest navigable slope threshold, it is denoted as a ramp. If the points are above the z=0 height of the floor, they represent objects or obstacles. It is appreciated that all points 214, due to noise, will contain some z-height variance, and accordingly the threshold for demarking a point 214 as a ramp should also include a minimum value so as to avoid demarking points 214 on a floor with marginally different z-values as ramps.

Figure 4:
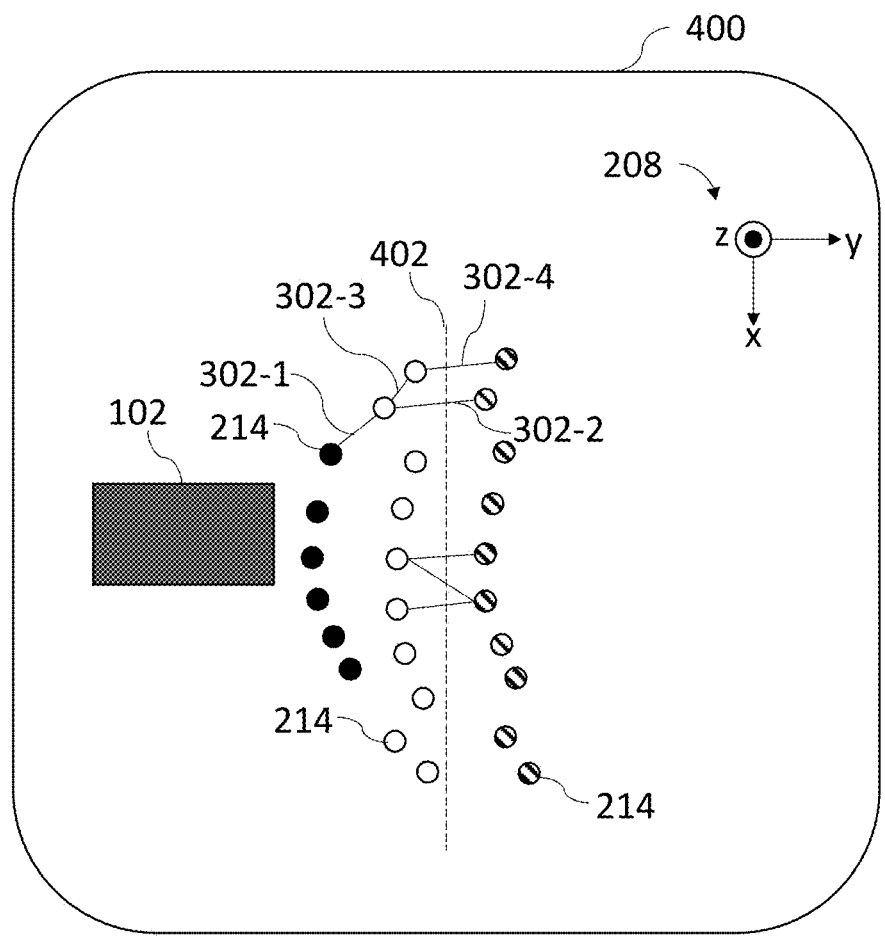
FIG. 4 is a computer readable map representing a cliff in front of a robot, according to an exemplary embodiment.

FIG. 4 depicts a computer readable map 400 produced by a robot 102 which is approaching a cliff 216, according to an exemplary embodiment. The robot 102 may be in a similar position and environmental scenario as depicted in FIG. 2 above, wherein FIG. 4 is a computer rendering of what the robot 102 views the environment to be from a top-down view. The cliff 216 is shown by a line 402 for reference to the reader, however it is appreciated that from the perspective of the controller 118 and robot 102, this line 402 is not mapped or known. Instead, the robot 102 collects a plurality of range measurements for points 214. The range measurements form approximate rings of points 214 moving in the +y direction. Points 214 demarked as cliffs represent the line of points 214 which are closest to the actual cliff, and since the robot 102 cannot navigate over these points, they effectively form a barrier preventing the robot 102 from navigating over the true cli as shown by line 402.

Consider edge 302-1 which connects two points 214 which both lie to the left of the cliff line 402 and are thus on the same floor as robot 102. Accordingly, the z-height difference between these two points 214 will be marginal, if any, and neither would be identified as a cliff 216. Next, edge 302-2 is considered, wherein the left point 214 is above the cliff 216 and the right point 214 is below the cliff 216. The resulting z-height difference is substantial and above a first, large threshold for a dangerous drop. Accordingly, the highest point 214 of the pair is labeled as a cliff point as shown by a white circle. Similar logic would apply for all other points 214 and edges 302 (not shown). The resulting map 400 would include an approximate line of points 214 which form a digital barrier for the robot 102 attempting to navigate over the cliff line 402. Consider an exemplary edge 302 between any two points 214 on the right of the cliff line 402. Since both points 214 would lie on the lower floor 220, neither would be marked as a cliff due to marginal changes in z-height.

In any case, a point 214 marked or encoded as a cliff cannot be later changed to be anything but a cliff, however non-cliff points 214 can be changed into cliff points if the above criterion are met for a given single scan. Subsequent scans which directly measure the same areas and result in a cliff or object that is no longer present can cause the formerly detected hazards to be cleared from the map, as discussed further in FIG. 8-9 below. For instance, consider edge 302-3 which, if taken alone, would indicate neither points 214 are cliff points despite being the closest point to the cliff line 402. These two points 214, however, are marked as cliffs due to the criterion for edges 302-2 and 304-4 being satisfied which indicate these are cliff points. Since demarcation as a cliff takes priority over non-cliff points, both points result as cliff points regardless of the order of operations (i.e., which edges 302 are checked first). Had the edge 302-3 been evaluated last without the state override prevention (i.e., preventing a cliff point from becoming a non-cliff), both points 214 would be overridden as floor points erroneously. Accordingly, by preventing cliff points from being overridden into non-cliff points within the processing of a singular scan, the algorithm can identify cliffs invariant of the order of evaluations of the edges 302. It is appreciated that a cliff point sensed in one scan and not sensed in a later scan of the same area may be overridden as a non-cliff point, as further described in FIG. 8 below.

Although shown as a plurality of circular points 214, it is appreciated that the map 400 is comprised of digital pixels (i.e., square regions). Pixels which contain these circular points 214 can be subsequently marked as 'floor', 'cliff/object', or 'hole', as discussed in FIG. 9 below. 'Floor' or 'free space' would indicate the region is navigable and not a ramp, cliff/object pixels would indicate the region is unnavigable, wherein the controller 118 will avoid navigating such that the footprint of the robot 102 on the map never coincides with such object/cliff pixels. It is noted that both the upper and lower floors are marked as navigable spaces despite the lower floor not being accessible at the present location, wherein the lower floor 220 could be accessed and navigated if there is a ramp elsewhere.

One skilled in the art may appreciate that the map 400 shown is a top-down projection of the environment onto a z=0 (or any constant) plane the robot is maneuvering on, however simple projection of the points onto the z=0 plane may not fully characterize the environment. Returning briefly to FIG. 2, consider the upper floor 218 to be the z=0 plane. The two points 214 shown on the lower floor 220 are localized by beams 210 which travel at an angle onto the lower floor 220, wherein the beams 210 intersect with the z=0 plane at a different (x, y) location than the measured (x, y) location of the points 214 on the lower floor 220 plane. Accordingly, when performing the cliff detection analysis, points 214 below the z=0 plane need to be back-projected along the direction of their respective beams 210 in order to denote a 'hole' in the z=0 plane of the environment due to the lowered floor 220.

Figure 5:
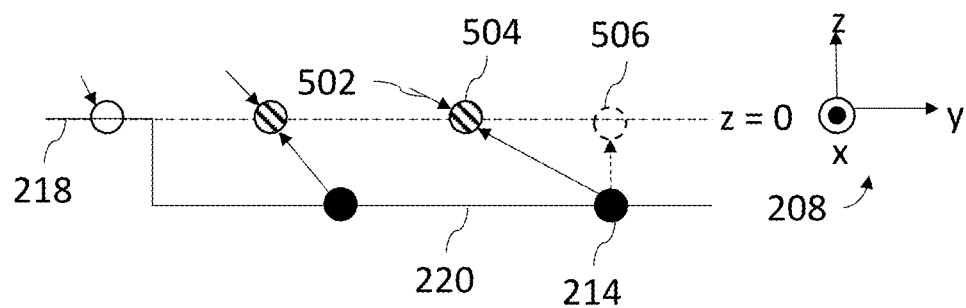
FIG. 5 depicts back-projection of hole points in accordance with some exemplary embodiments of this disclosure.

FIG. 5 depicts three points 214, one is localized on an upper floor 218 and two are localized on a lower floor 220, according to an exemplary embodiment. As discussed above in FIG. 5, the lower floor 220 should also be marked as navigable space, wherein the robot 102 is prevented from going over the cliff 216 due to a virtual wall/barrier of cliff points closest to the upper-side edge of the cliff 216. It is essential, however, that when representing the environment on a computer readable map that the points 214 which sense areas below the z=0 map plane, referred to herein as 'hole' points, are properly localized, in (x, y) space, on the plane of the map. A plurality of vectors 502 are depicted corresponding to the path traveled by a beam 210 which localizes each respective point 214. Consider the rightmost point 214 which localizes the lower floor 220 below the z=0 plane. From a top-down view, the point 214 would appear in location 506 however the 3D range sensor 202 did not collect a measurement at the location 506, it measured the point 214 on the lower floor. In other words, no beam 210 passed through location 506 and thus no measurements were taken at this location. Accordingly, marking the location 506 as navigable floor on the z=0 plane, which is the plane of the map, is improper. For the rightmost point 214 to sense the lower floor 220, the beam 210 emitted by the sensor 202 which measures that point 214 must have passed through the z=0 plane along the path of vector 502 uninterrupted. Since no objects were sensed at the intersection between the vector 502 and the z=0 plane (i.e., at location 504), robot 102 may determine that this location is free of objects/obstacles since a beam 210 of light passed through this location 504. The same cannot be said about location 506 which could still include an object (e.g., one with an overhang) which has not been sensed.

In other words, since the map 400 produced by the robot is a 2-dimensional top-down projection of the environment at the z=0 plane, the regions (e.g., pixels) denoted as navigable floor, object, cliff, etc. should correspond to navigable floor, objects, cliffs, etc. at the z=0 plane or above.

Figure 6:
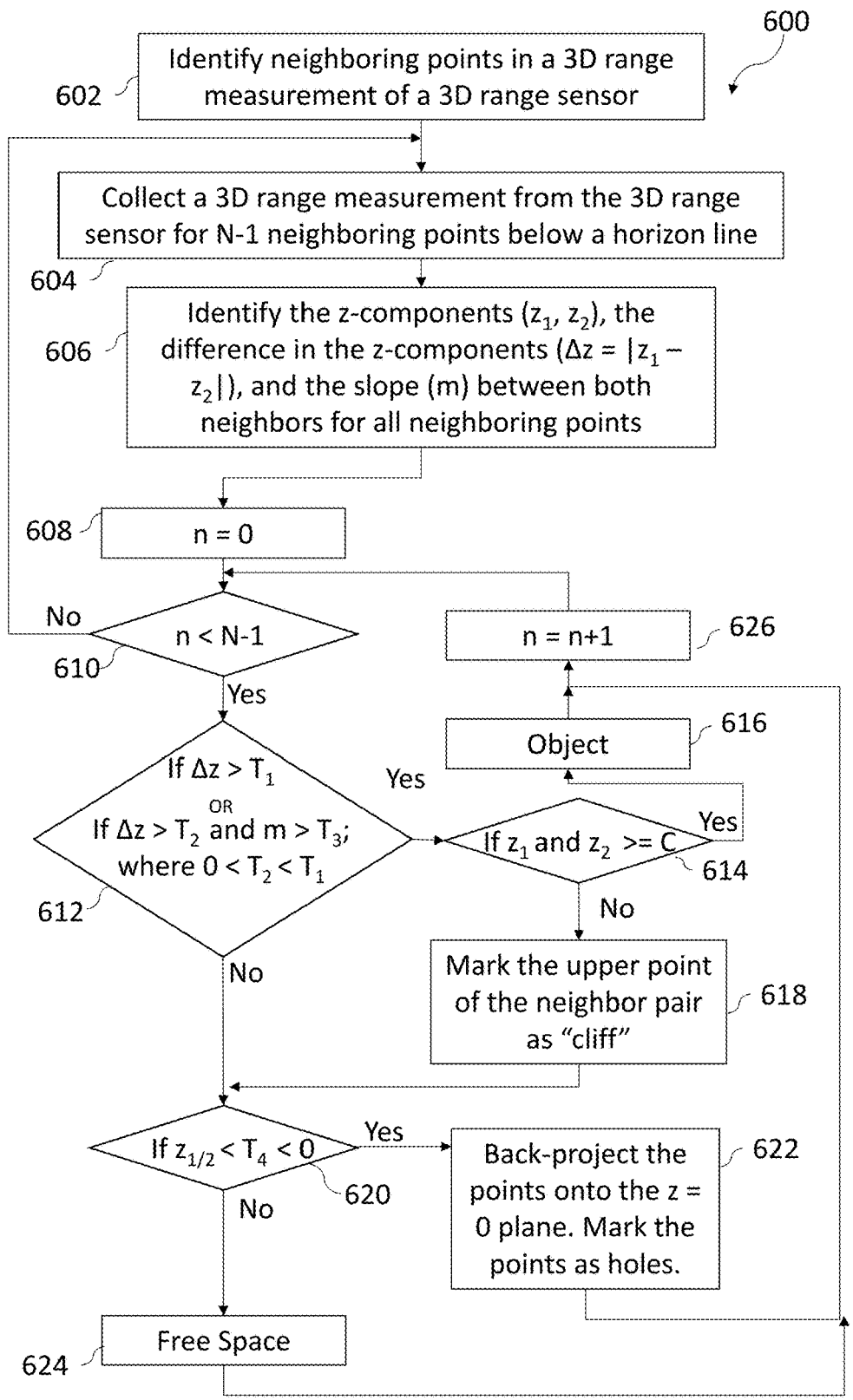
FIG. 6 is a process flow diagram illustrating a method for processing a three-dimensional range measurement to produce a computer readable map, according to an exemplary embodiment.

FIG. 6 is a process flow diagram illustrating a method 600 for encoding a pixel of a computer readable map as "free space", or "navigable space"; "object" corresponding to an obstacle to avoid; and "hole" corresponding to potentially navigable space which is inaccessible, such as a lower/upper floor different from the floor of a robot 102, according to an exemplary embodiment. Steps of method 600 are effectuated via a controller 118 of the robot 102 executing instructions from a non-transitory computer readable storage device. Method 600 denotes the process for encoding pixels of a map corresponding to N−1 range measurements from a 3D LiDAR. It is appreciated that not all pixels of the map would be updated for each scan from the LiDAR, wherein only pixels of the map which coincide with a range measurement point 214 are updated. The parameter N−1 is a whole number representing the total number of points 214 of a scan below a horizon line 206, or N may represent the number of edges 302 in the scan. Parameter n is used as a counter in method 600.

Block 602 begins with the controller 118 identifying neighboring points in a 3D range measurement from a 3D range sensor 202. The neighboring points considered in block 602 are those which are projected from the sensor 202 below a horizon line 206. In other words, the only points considered in block 602 correspond to beams 210 which will, given enough distance, be incident on an infinitely large flat floor. Neighboring points may be identified via a process of Delaunay triangulation, as described in FIG. 3 above. Since the projection vectors of the beams 210 emitted from the sensor 202 remain substantially static, the neighboring points to any given point would also be static. Accordingly, block 602 may be performed offline, such as when the robot 102 is powering on, shutting down, idle, or other instance separate from operation. Alternatively, block 602 could be initiated during operation, e.g., every 5 minutes or different timeframes. While generally unnecessary to verify neighboring points on frequent timescales, over time the projection vectors of beams 210 may vary slightly due to mechanical defects, vibrations (e.g., from the robot 102 moving), thermal expansion, degradation of components, lens scratches, etc.

Block 604 includes the controller 118 collecting a 3D range measurement from the 3D range sensor, the range measurement comprises N−1 total beams 210 which are below the horizon line.

Block 606 includes the controller 118 identifying the z-components ($z_1$, $z_2$) for a given pair of neighboring points, the difference in the z-components (i.e., $\Delta z = |z_1 - z_2|$), and the slope (m) between the neighboring points. The slope (m) is calculated based on the z-height difference between the two points divided by the Euclidean distance between the two points in the x-y plane.

Block 608 includes the controller 118 setting a parameter "n" equal to zero. The parameter n will represent a counter. Block 610 includes the controller 118 performing the following steps until the parameter n equals N−1. Once all N−1 neighboring points are evaluated, the next scan can be acquired and processed in block 604.

Block 612 includes the controller 118 determining if a cliff is present. The controller 118 may compare $\Delta z$ to a first threshold $T_1$. $T_1$ may represent a numerically large value indicative of a cliff, or sharp and large drop, wherein a change in z between two neighbors being large would indicate an unnavigable cliff. For example, $T_1$ may be 0.5 meters. The first threshold is utilized to identify sharp and large drops which, under no circumstances, could ever be navigable. It is appreciated that $\Delta z$ is the absolute value of the difference between $z_1$ and $z_2$, wherein the "cliff" being identified here could be sensed while the robot 102 is positioned at the top or bottom of the cliff.

In some embodiments, $T_1$ may be determined by the height of a cliff the robot 102 is unable to navigate upwards rather than risk of damage in falling downwards. For instance, a robot 102 may be capable of navigating down a 1 inch drop without risk of damage but may not be able to navigate back up the 1 inch drop and, accordingly, become stuck. To avoid the robot 102 potentially navigating into regions it cannot escape. $T_1$ may be configured to comprise a value which enables navigation up the cliff/drop as well and prevent navigation into these regions.

Although large cliffs and drops pose the most substantial risk for robots 102, ramps require additional consideration since some ramps may be navigable and others may not be. Accordingly, second and third thresholds $T_2$ and $T_3$ are implemented. First, threshold $T_2$ would denote a maximum change in altitude permitted for being a navigable ramp. Second, the slope m is compared to threshold $T_3$, wherein the slope m should be equal to or lower than the third threshold $T_3$ which represents the maximum slope, or "steepness", of the ramp. Although the slope m naturally identifies a change in elevation over a distance, some environment scenarios may cause the spatial (i.e., x, y) separation between neighboring points to be large, therefore necessitating the two threshold $T_2$ and $T_3$ be considered separately. The precise value of $T_2$ and $T_3$ would be dependent on the capabilities and form factors of the robot 102. For example, top-heavy robots 102 may not be able to navigate slopes which bottom-heavy robots are able to maneuver. Other parameters, such as tire/wheel/tread friction, weight of the robot, speed of the robot, and/or tasks performed by the robot may also be considered. Preferably, the value of the slope threshold. $T_3$, should be slightly smaller (i.e., with less incline) than the steepest possible slope navigable by the robot to account for, e.g., sensor noise. Further, one should also consider any tipping motions as a result of changing from a flat to a sloped surface in determining an appropriate value for $T_3$.

Upon the controller 118 determining that the slope between the two neighboring points is lower than $T_3$ and the $\Delta z$ difference between the two neighboring points is lower than $T_2$, the controller 118 determines the two points are not cliffs or sharp drops and continues to block 618. Other methods of determining free space around a robot used in conjunction with method 600 are further discussed in FIG. 9 below.

Upon the controller 118 determining the slope between the two neighboring points 214 is larger than $T_3$ and the slope is larger than $T_2$; or, the $\Delta z$ difference is larger than $T_2$, then the controller 118 moves to block 614.

Block 612 includes the controller 118 determining if $z_1$ and $z_2$ are greater than or equal to C, wherein C corresponds to a constant height above the floor upon which the robot 102 is presently navigating upon. C in some embodiments may be zero, however sensory noise and other perturbations may cause one or more points 214 which localize a floor to be slightly above the floor. Both values being greater than zero would indicate the presence of an object, hence the controller 118 moves to block 614. In some embodiments, the value of C is on the order of two to three centimeters above the floor, as points 214 which are only marginally above the floor are likely a result of noise. Points 214 which lie above the z=0 plane of the floor at a height of C inches/meters or above are considered to be objects, the wherein other points 214 remain as navigable floor.

Upon the controller 118 determining that one or both points 214 of the pair include a z value greater than C, the controller 118 moves to block 616 and encodes the one or both points 214 above z=C as "object" points. These object points 214 will, upon rasterization of the point cloud into a pixel-wise map, indicate regions (i.e., pixels) which the robot 102 cannot navigate over. If only one of the two points 214 is above z=C, then only the point above z=C is denoted as object and the other remaining point is maintained as sensing navigable space.

Upon the controller 118 determining that neither points 214 of the pair include a z value greater than C, the controller 118 moves to block 618 and encodes the one or both points 214 above z=C as "object" points. Object points prevent navigation by the robot 102 at their location.

Block 618 includes the controller 118 marking only the upper point of the two neighboring points 214 as a "cliff". The upper point refers to the point 214 of the neighboring points 214 which has the largest z value, in actual value not absolute value. By marking only the upper point 214 as cliff, the corresponding range measurement which senses the area closest to the cliff is denoted as cliff allowing for the maximum amount of safe navigation on the current floor of the robot 102. Further, by not denoting the lower point as a cliff the lower floor is preserved as potentially navigable, e.g., by use of a navigable ramp.

According to at least one non-limiting exemplary embodiment, ramps may carry a special denotation as "ramp" pixels on the computer readable map. Upon traversing these ramp pixels, the robot 102 is made aware of a change in elevation of the operative floor (i.e., identify it is now on a different z-plane) as well as potential coordinate transformations due to the incline/decline of the sensors of the robot 102 which are otherwise calibrated while the robot 102 rests on a flat surface. Stated another way, a 5 m range measurement taken by a straight-ahead beam (e.g., beam 212 in FIG. 2B) would localize a point 214 in a different (x, y, z) location while the robot is on a flat floor versus inclined on a ramp, wherein the incline must be accounted for while mapping and navigating on ramps. Additionally, while navigating the ramp, the horizon line may change as a function of the slope of the ramp and direction of travel (i.e., up or down the ramp). It is appreciated that ramp pixels should still be capable of being changed to cliff points if, for example, the ramp is surrounded by a sharp drop on its side(s), following the same determination as in block 618.

Upon denoting the upper point 214 of the pair as a cliff in block 618, the controller 118 moves to block 620. Block 620 includes controller 118 comparing both $z_1$ and $z_2$ to a fourth threshold $T_4$ which is a fixed value below zero. In some embodiments, $T_4$ equals-C. The fourth threshold $T_4$, also referred to herein as the hole threshold, is utilized to identify holes. Holes, as described briefly above, correspond to points 214 which are substantially below the z=0 plane of the map. Substantially in this context refers to a value below z=0 which is not attributed to mere noise. Visually, with reference to FIG. 5, points 214 below the z=0 plane require a ray 210 to effectively 'punch a hole' through (i.e., cross) the z=0 plane of the map to localize a point 214. In turn, since the ray 210 went through the z=0 plane, it can be assumed that no object or floor is present at the z=0 plane along the path of the ray 210, otherwise that ray 210 would have reflected off of the object or floor. The lack of floor is primarily concerning as the hole points may indicate a potential fall. As shown and described in FIG. 5, a z-only projection would improperly map the space and thus require additional consideration when constructing a map of the z=0 plane. Additional discussion and illustration relating to holes is provided below in FIG. 7A-B below.

Upon the controller 118 denoting that one or both of the two neighboring points 214 are below $T_4$, then the controller 118 moves to block 622.

Upon the controller 118 denoting that neither of the two neighboring points 214 are below $T_4$, then the controller 118 moves to block 624.

Block 622 includes the controller 118 back-projecting either or both of the points 214 $z_1$ and/or $z_2$ which are below $T_4$ onto the z=0 plane of the map. Back-projection, as used herein, corresponds to projecting points 214 backwards along the path of the ray 210 which localizes the points 214 until their z value equals the plane of the map (i.e., zero in this disclosure). Once the points 214 are back-projected, the controller 118 may mark them as "hole" points. Holes correspond to locations where the robot 102 should not go since, from the perspective of the computer readable map of the z=0 plane, there is a 'hole' in (or a drop underneath) the map at the back-projected locations.

It is appreciated that a cliff point, marked in block 618, may be changed into a hole point if the entire cliff itself lies below the z=0 plane of the map as determined by block 620. While these might be legitimate cliffs on, e.g., a lower floor, they still pose the same risk as other holes in the map floor and accordingly denoting these points as holes is appropriate even if they truly sense a real cliff. That is, even if a real cliff is sensed below the z=0 plane of the map, the robot 102 still does not sense navigable floor space at the (x, y) area above the real cliff nor any floor along the path of the beam used to sense the real cliff (e.g., see FIG. 5, specifically location 506 and 504). Therefore, the points 214 generated should still be back-projected to indicate where in the z=0 plane light from the sensor 202 was able to pass through, regardless of there being a ramp, cliff, object, etc. below the z=0 plane.

While the above disclosure is largely centered around ideal and simple scenarios, practical applications of a 3D range sensor require additional considerations. For instance, many 3D range sensors include a minimum range and would be unable to localize points 214 below the minimum range. For the purpose of navigating a robot 102 without collision, a minimum range for perception may impact task performance (e.g., a robot 102 configured to follow walls). Generally, and depending on the specific manufacturer of the 3D range sensor 202, objects below the minimum range of the sensor 202 would generate (i) no reading, or (ii) a maximum range. Similarly, highly reflective or absorptive objects may also generate no returning range measurement due to deflection or absorption of the emitted light. For the purpose of this disclosure, a "no reading" can be treated as an infinitely large and/or maximally large range, wherein the sensor 202 would determine the ray 210 was emitted and never reflected back to the sensor and thus detects no objects along its path at least until the maximum range.

Figure 7A:
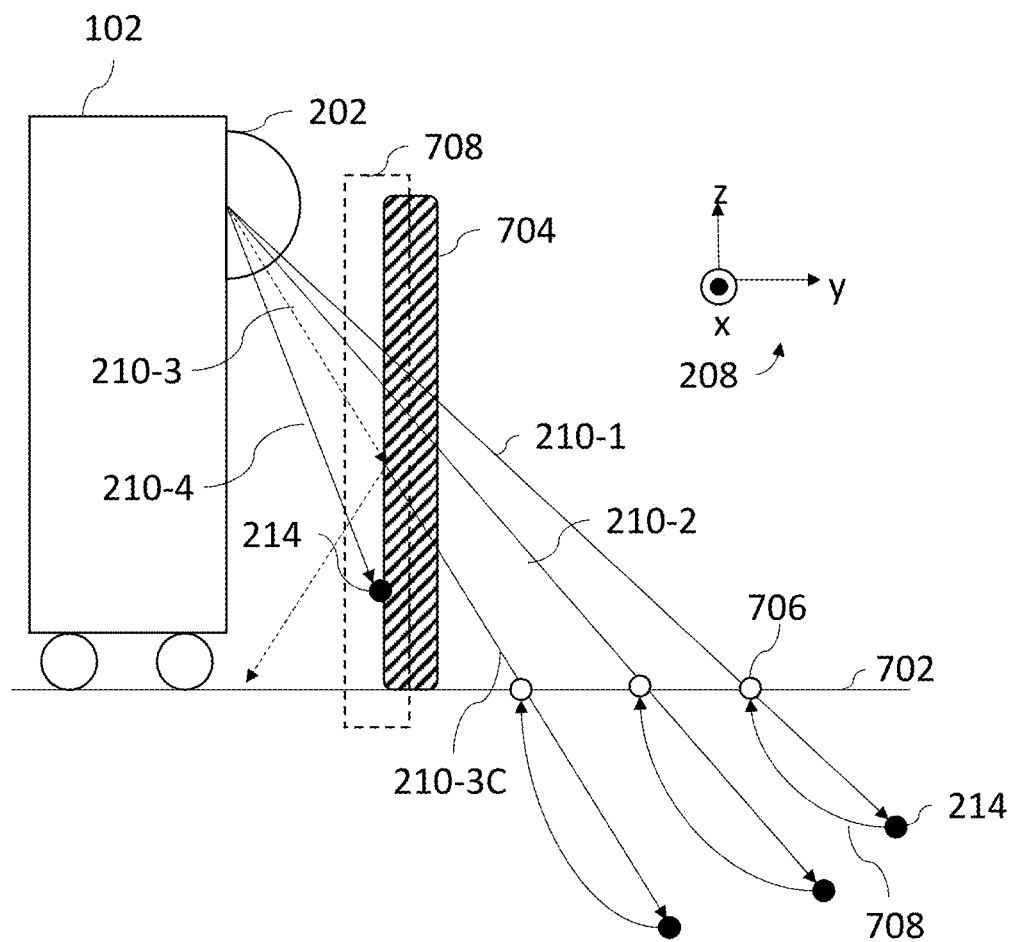
FIG. 7A is a side view of a robot 102 encountering a scenario which generates erroneous, maximal range measurements, according to an exemplary embodiment.

FIG. 7A depicts a robot 102 navigating on a flat surface 702 and encountering a black and/or reflective object 704 or an object which is positioned below the minimum range of the sensor 202, causing the sensor 202 to generate a plurality of erroneous points 214 at its maximum range, according to an exemplary embodiment. The robot 102 will produce a computer readable map shown in FIG. 7B below while avoiding collision with the object 704. It can be assumed that the current goal of the robot 102 is to move left to right in FIG. 7(i-ii), past the object 704. Accordingly, the robot 102 must sense the object 704 and avoid it by localizing the object 704 onto the map and planning a route around the mapped object.

It is appreciated that the scenario depicted in FIG. 7(a) is a two-dimensional profile view comprising depicting only a "slice" of the range measurements from the 3D range sensor 202, wherein one skilled in the art may appreciate that the sensor 202 would generate similar points 214 and/or holes 706 for other planes along the x-axis (i.e., into and out of the page). The present discussion will primarily discuss measurements only along this illustrated plane, however it is appreciated that depiction/discussion of only a singular plane is for illustrative clarity only.

The sensor 202 is shown to collect four range measurements corresponding to four depicted rays 210-1, 210-2, 210-3, and 210-4. Rays 210-1 and 210-2 are incident upon the object 704 at a distance below the minimum range of the sensor 202 and accordingly return no or maximal ranges. These no or maximal ranges generate points 214 well beyond the object 704 as shown by ray paths 210-1, 210-2. It is noted that the ray paths 210-1, 210-2 shown are not the physical path traveled by the beam of light, rather it is the determined path of the beam 210-1, 210-2 by the controller 118 given the lack of reflected signal. As mentioned above, the controller 118 receiving a maximum range will assume there are no objects between the sensor 202 and the localized point 214 since light had to travel this path unobstructed to produce the no return signal, however the controller 118 is not aware or considering of the object 704 within the minimum range or the object 704 being highly reflective/absorptive which generates such erroneous measurements. Since both points 214 corresponding to beams 210-1 and 210-2 are well below the z-plane of floor 702, accordingly both points 214 are identified as holes 706 and back-projected 708 along the inverse path of rays 210-1, 210-2 onto the z=0 plane of the map. One may note that, in the current scenario, the robot 102 has erroneously labeled a floor 702 with "hole" points 706. Further, the occlusion by the object 704 causes the controller 118 to be unable to rectify this error for now. However, method 600 can correct these errors as will be discussed below in FIG. 8A-C below.

Next, beam 210-3 which may or may not be incident on the object 704 within the minimum range exhibits a specular reflection on the surface of the object 704. Accordingly, due to the beam 210-3 exhibiting a specular reflection, it never returns to the sensor 202 and thereby generates no range or a maximum range reading. The physical path traveled by beam 210-3 is shown in a dashed line. However, since no return signal was received, the controller 118 assumes the beam 210-3 traveled without encountering any object and thus assumes the path of the beam to be 210-3C, shown by a solid line. Similar to the prior two points 214, the generated point 214 is well below the z=0 plane and is back-projected as a hole point 706 on to the z=0 plane of a map 710 shown in the following figure.

Lastly, beam 210-4 is incident on the object 704. Since the 3D range sensor emits beams in a spherical pattern, some beams 210-4 will be incident on the object 704 at distances larger than the minimum range and generate at least one point 214 thereon. The beam 210-4 in this example is one which is incident upon the object 704 well below the critical angle for total internal reflection. This allows at least a portion of the emitted light 210-4 to be absorbed and re-emitted, or diffusely reflected (depending on the surface material, color, and smoothness), back to the sensor 202 such that a point 214 is generated. As shown visually in FIG. 7(a), the point 214 is properly on the surface of the object 704.

It is appreciated that in many situations one or more points 214 may still be generated on a reflective, absorptive, and/or very close object, wherein the three beams 210-1, 210-2, 210-3 are depicting various scenarios which would generate one or more erroneous points at maximal ranges.

Figure 7B:
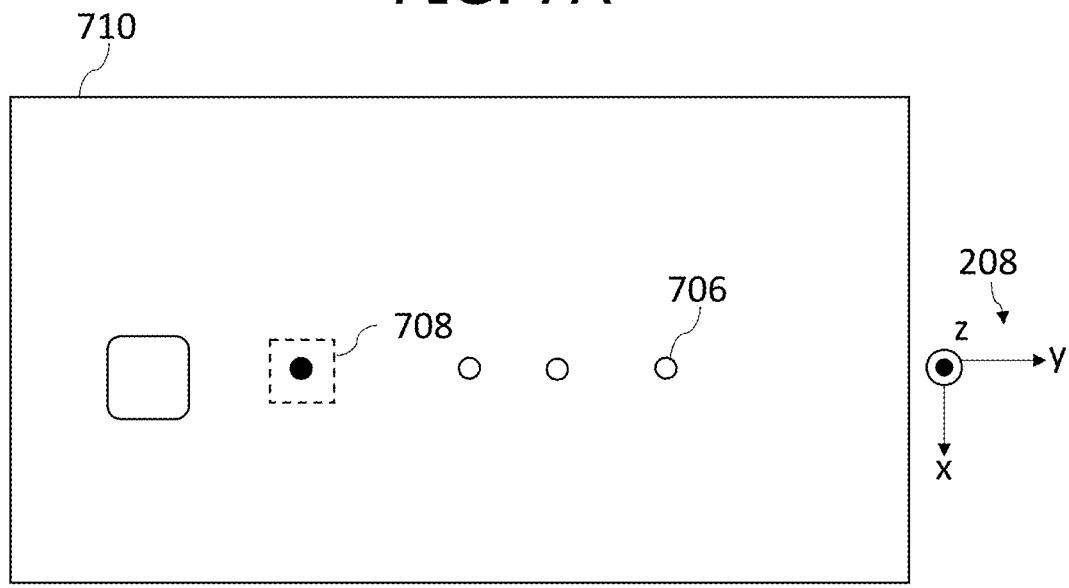
FIG. 7B depicts a computer readable map produced by the robot of FIG. 7A in accordance with the method described in FIG. 6, according to an exemplary embodiment.

Next, FIG. 7B depicts the computer readable map 710 formed by the four range measurements illustrated in FIG. 7A, according to an exemplary embodiment. The object 704 is not shown on the map 710 as the map 710 is constructed purely from the range measurements of the sensor 202. In practice, a robot 102 may utilize multiple sensors of various types to construct the map 710 but for the purpose of explanation for the current systems and methods, the map 710 construction has been intentionally simplified. The generated map 710 is a top-down view of the environment. All objects which are above z=0 and below a set maximum height (e.g., the height of the robot 102) should be projected onto the z=0 plane such that the area they encompass within this height range is mapped to avoid collisions. Points above the height of the robot 102 are typically ignored since any objects at or above such height do not pose a collision risk, wherein filtering such points from consideration improves the rate at which each scan is processed by the controller 118.

As shown on map 710, a single object point 214 is localized in front of the robot 102. A hashed box 708 shown in FIG. 7B from a top-down view corresponds to the same box or region 708 shown in FIG. 7A from the side view. Behind the region 708, the three (3) hole points 706 are mapped. One of ordinary skill in the art may appreciate that if object 704 extended horizontally along the x-axis, additional points 214 and holes 706 would be localized in a similar manner above and below the row of points 214 and holes 706 shown. As previously mentioned, the map 710 is a z=0 projection of the environment, wherein even a single object point 214 within region 708 would prevent the robot 102 from navigating to that location. That is, despite only sensing the base of the object 704 (or, in other cases, the top-portion, far left/right side portions, or any combination thereof) the map 710 prevents the robot 102 from colliding with it.

Now that the map is constructed, the robot 102 must utilize the map to plan its paths, wherein the erroneous hole points 706 prevent the robot 102 from planning a path where there it believes there is a "hole" (or drop) in the map plane. With reference to FIG. 7A, the floor 702 is completely flat and object free and should otherwise be navigable. Accordingly, clearing logic upon acquiring new scans will be discussed next in order to allow the robot 102 to, upon moving and collecting new scans, clear the erroneous holes 706 from the map 710.

Figure 8A:
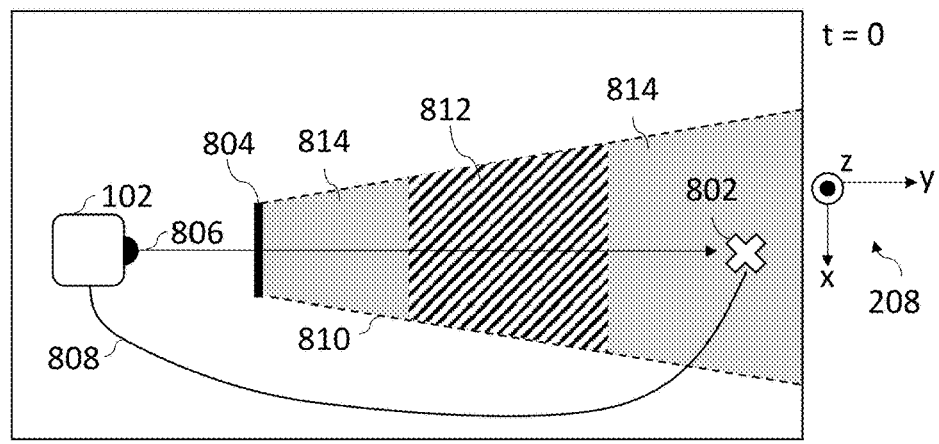
FIG. 8A-C depict a robot navigating to a goal point and correcting erroneous determinations on its computer readable map used to plan a route, according to an exemplary embodiment.

FIG. 8A depicts the map 710 shown previously in FIG. 7B, wherein additional pixel values along the x-axis have been calculated and mapped accordingly. The goal of the robot 102 is to at least navigate from its current location to a goal point 802, which is in an unsensed location. For simplification, it may be assumed that the robot 102 is holonomic in the x-y directions, that is capable of omnidirectional movement with zero turn radius. Other robots, such as tricycle drive, four-wheel drive, etc. robots are also considered with conventional constraints on motion planning appreciated by those skilled in the art. The map includes a plurality of pixels, each representing a spatial area in the environment. The map is constructed by rasterizing points 214 into voxels or pixels and encoding the voxels or pixels with corresponding labels. The labels considered herein are at least: (i) robot pixels, representing the robot 102; (ii) route pixels, representing the path of the robot which should never coincide with objects, cliffs, or holes; (iii) object pixels, representing objects (block 614) as shown in black; (iv) unknown pixels 814, corresponding to unsensed regions as shown in grey; (v) cliff pixels; and (vi) hole pixels 812.

Starting in FIG. 8A, the robot 102 encounters a barrier 804 between itself and its goal 802. The initial route 806 was calculated before the first scan which senses the barrier 804 was acquired, wherein one may presume the route 806 was calculated using a blank (i.e., object-free) map at t=0. Upon acquiring the first scan and processing the data in accordance with method 600 at time t=1, however, the determined route 806 then coincides with the object 804 and hole points 812, and accordingly must be recalculated. While in some embodiments the controller 118 is permitted to plan the route for the robot within unknown or unsensed regions 814, the robot 102 under no circumstance should plan a route which coincides with objects or holes. Each increment of time t corresponds to the controller 118 processing one 3D range scan and updating the computer readable map and/or route once. In practice, controller 118 may synthesize data from a plurality of sensors to update the map during each control cycle, or may be operated with asynchronous control cycles, wherein the following discussion only considering one sensor is purely for illustrative purposes without limitation.

In accordance with the present map at time t=1, controller 118 may decide to cause robot 102 to go around barrier 804 such as by taking path 808. Due to the spherical nature of the 3D range sensor, an approximate cone of unsensed region appears behind barrier 804. Further, due to the barrier 804 being closer than the minimum range of the sensor, holes 812 are generated behind the barrier 804, as discussed above in FIG. 7A-B. Alternatively, the scenario depicted may be illustrative of the robot 102 encountering a reflective surface, e.g., mirrors, or infrared absorbing surface, such as matte black surfaces, which also return no range measurements under some conditions. As shown in the following FIG. 8B however, the robot 102 has moved and acquired a new 3D range measurement from a different perspective.

Figure 8B:
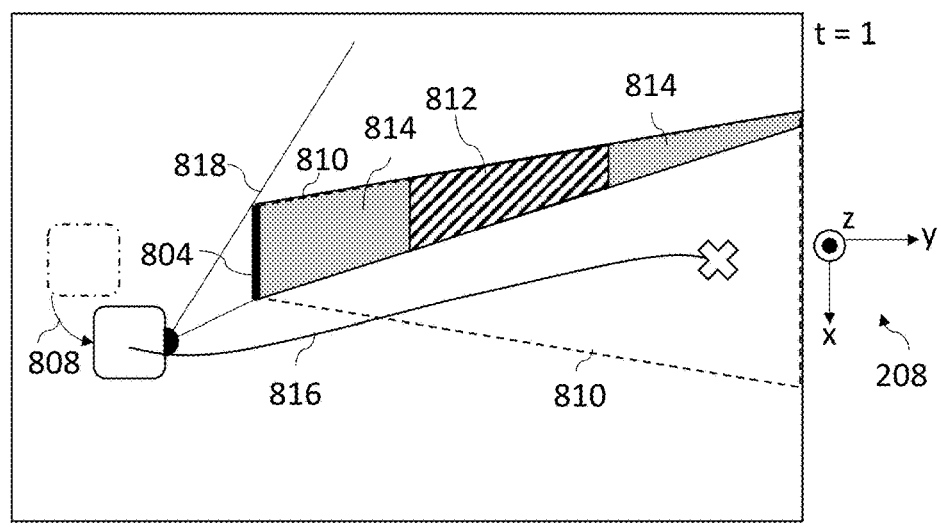

The prior cone of unsensed region 810 is replicated in FIG. 8B for reference. It is appreciated that the robot 102 retains at least the prior map state from the past iteration (i.e., when the previous scan was acquired and processed) at time t=0. From its current position, the sensor still include some unsensed area behind the barrier 804 as shown by field of view lines 818. However, a large portion of the previously unsensed region 810 is now detectable and accordingly changed to free space upon the controller 118 sensing the flat floor in this area. The hole region 812 has been substantially reduced upon the controller 118 acquiring a new measurement which confirms there is no hole in this location in accordance with method 600. The area above the cone 810 was previously determined to be free space thus the area is maintained as free space despite field of view lines 818 being unable to sense behind the barrier 804, in part, from the present location. Accordingly, the route 808 has been updated to route 816 which is shorter and more direct to the goal point 802. The new route 816 passes through the former erroneously detected hole region 812.

Figure 8C:
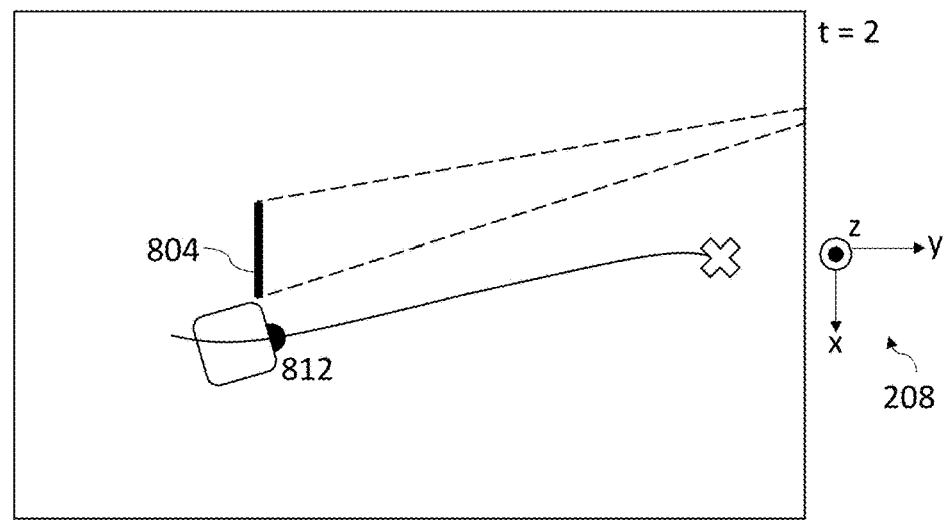

Lastly, in FIG. 8C, the robot 102 continues along route 816 and eventually passes the barrier 804 to arrive at its illustrated location. From this position, the entire region 818 previously containing unknown and/or hole points is now detectable by the 3D range sensor. Following method 600, the unknown 814 and hole 812 areas at t=1 is directly sensed and, accordingly, denoted as free space which enables the controller 118 to plan routes therein. Since the entirety of route 816 was already in the free space region 816 and of minimal length, no adjustments are required and the robot 102 may continue along this path. In other scenarios, adjustments to the planned route 816 may be made whenever a shorter, faster, and/or more task-aligned (e.g., robot 102 may be biased to navigate in some regions over others) route is calculated, wherein the route excludes any navigation into an object (e.g., 904), hole 812, or cliff. It is appreciated that had a real hole (i.e., lower floor or other lowering of elevation) existed at the locations 812, these locations would remain as hole points in accordance with method 600 after the robot 102 maneuvers such that a direct measurement of these regions is enabled (e.g., FIG. 8B). Alternatively, if there had been objects above z=0, those locations would be changed from hole 812 or unknown 814 to object pixels 804.

Additionally, at the time t=2 position, the robot 102 may be close enough to the barrier 804 such that hole points 812 are projected in the approximate top-left of the map shown in FIG. 8C, however these would not impact the route 816 and could be cleared (i.e., made into free space, object, or cliff pixels) once the robot 102 navigates back to these regions and collects new direct measurements for these areas.

Advantageously, the mapping method 600 disclosed herein not only is capable of mapping cliffs, distinguishing between navigable and unnavigable ramps, and maintaining safety with accurate hole re-projection, but is further capable of handling erroneous measurements caused by range sensor limitations, reflective objects, or black absorptive objects. Further, the method 600 is capable of performing all of these features without substantial memory requirements as only the map state during the prior control cycle needs to be retained in order to accurately and safely plan a route.

Figure 9:
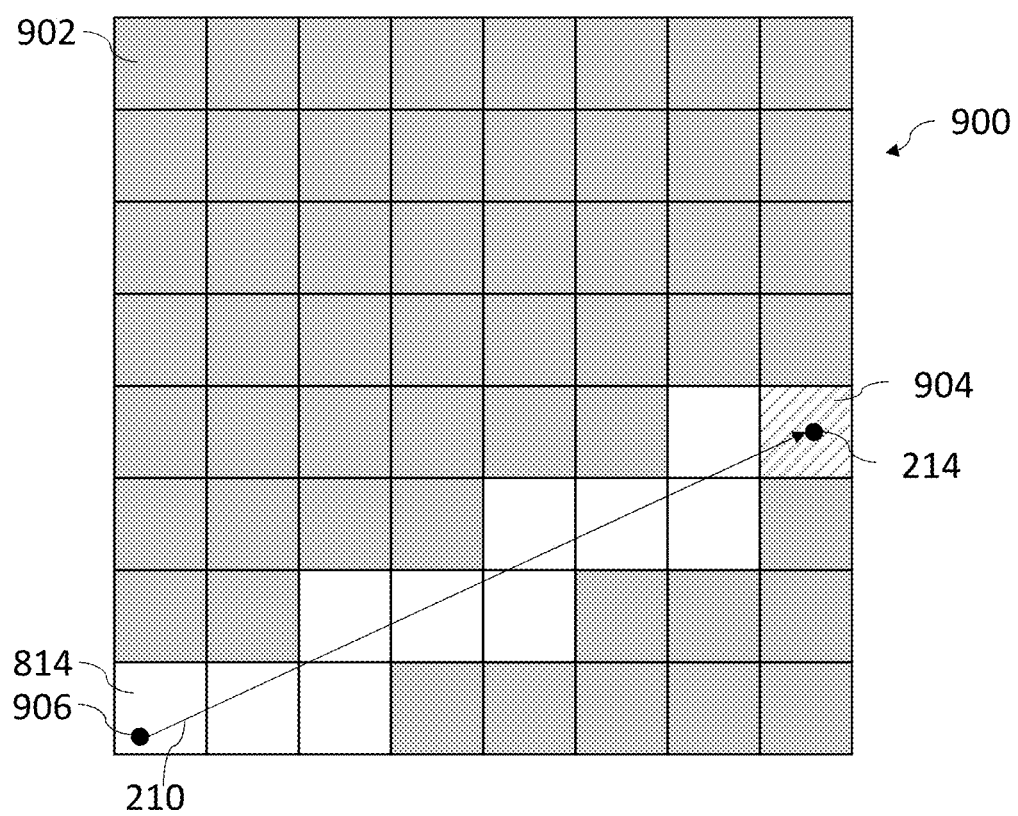
FIG. 9 depicts a method for ray tracing to determine free space around a robot, according to an exemplary embodiment.

FIG. 9 depicts a grid 900 of pixels 902 which represent a portion of a computer readable map, in accordance with some exemplary embodiments of this disclosure. On the grid 900 is an origin point 906 which forms the base of a ray 210. Ray 210 represents a beam from a range sensor, wherein the origin point 906 corresponds to the origin of that sensor (e.g., the focal point of its lens). The ray 210 extends from the origin 906 to a point 214 on the surface of an object, wall, cliff, or other z>0 object point.

In order to determine the free space 814 on this grid 900, a controller 118 may calculate each and every pixel 902 within which the ray 210 passed without being reflected. The controller 118 simulates this by digitally tracing the path a beam of light would have needed to take between origin 906 and the point 214. Effectively ray tracing between the origin 906 and the localized point 214, wherein all pixels 902 containing the traced ray 210 are denoted as free space 814. The final pixel 904 which contains the point 214 itself may be labeled as a free space (if the point is navigable floor, as determined by method 600), object, cliff, or hole. Pixels 902 which never contained a point 214 or pixels which do not contain any ray 210 paths therein remain in the 'unknown' state.

Within a given scan, a pixel determined to contain an object 904, hole 812, or cliff cannot be overridden by other rays 210 of the given scan. For example, consider a ray 210 from the sensor emitted adjacent to the illustrated ray 210 which could pass through the pixel 904 at least in part and localize a point 214 in another pixel farther away. The pixel 904 should remain as an object, cliff, or hole until a subsequent scan determines no object, cliff, or hole is present in accordance with method 600. The subsequent scan would be responsive to, e.g., the object moving to a different location, wherein clearing object pixels of its former location is appropriate only if the former location was directly observed to no longer contain the object by a later observation.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A robotic system, comprising:
a three-dimensional ("3D") range sensor;
a memory comprising a plurality of computer readable instructions stored thereon; and
at least one controller configured to execute the computer readable instructions to:
receive a range measurement from the 3D range sensor, the range measurement comprises a plurality of points, each of the plurality of points comprises at least one neighboring point;
determine, for each point of the plurality of points, that one or more of the points correspond to a cliff based upon at least one of: (i) a magnitude of a vertical difference between the point and the at least one neighboring point being greater than a first value, and (ii) a magnitude of a vertical slope between the point and the at least one neighboring point is greater than a second value; and
rasterize each point determined to represent the cliff into a pixel on a map to cause the robotic system to avoid the pixels on the map representing the cliff.

2. The robotic system of claim 1, wherein,
the plurality of points comprise a subset of all points generated by the 3D range sensor, and
the subset corresponds to a portion of all points generated by beams of the 3D range sensor which are below a horizon.

3. The robotic system of claim 1, wherein,
the at least one neighboring point for each of the plurality of points is pre-computed prior to the controller receiving the range measurement.

4. The robotic system of claim 1, wherein the controller is further configured to execute the computer readable instructions to:
determine, for each point of the plurality of points, that one or more of the plurality of points correspond to at least one hole if the point is below a third value, the third value corresponds to a height below a plane of the map;
back-project the hole points along a path of a beam used to localize the corresponding hole points, the back projection goes until a point where the beam intersects the map plane; and
rasterize the back-projected hole point as a pixel on the map, the pixel on the map is at the point where the beam intersects the map plane, wherein
the hole pixel prevents navigation thereon by the robotic system.

5. The robotic system of claim 1, wherein the controller is further configured to execute the computer readable instructions to:
determine pixels which lie between a given point and the 3D range sensor; and
rasterize the pixels which lie between the given point and the 3D range sensor as free space, wherein the rasterizing configures the robotic system to plan a path therein.

6. The robotic system of claim 1, wherein the controller is further configured to execute the computer readable instructions to:
determine, for each point of the plurality of points, that one or more of the points correspond to a navigable ramp based upon (i) the magnitude of a vertical difference between the point and the at least one neighboring point being less than the first value, and (ii) the magnitude of the vertical slope between the point and the at least one neighboring point is less than the second value; and
rasterize each point determined to represent the navigable ramp as a ramp pixel on the map, wherein the rasterizing configures the robotic system to permit navigation thereon.

7. The robotic system of claim 6, wherein the controller is further configured to execute the computer readable instructions to:
apply a transformation to data from the 3D range sensor based upon the vertical slope of the ramp when navigating the robotic system onto the ramp.

8. A method for navigating a robotic system, comprising:
receiving, via a controller of the robotic system, a range measurement from a three-dimensional ("3D") range sensor, the range measurement comprises of a plurality of points, each of the plurality of points comprises at least one neighboring point;
determine, for each point of the plurality of points, that one or more of the points corresponds to a cliff based upon at least one of: (i) a magnitude of a vertical difference between the point and the at least one neighboring point being greater than a first value, and (ii) a magnitude of a vertical slope between the point and the at least one neighboring point is greater than a second value; and
rasterize each point determined to represent the cliff into a pixel on a map to cause the robotic system to avoid the pixels on the map representing the cliff.

9. The method of claim 8, wherein,
the plurality of points comprise a subset of all points generated by the 3D range sensor, and
the subset corresponds to a portion of all points generated by beams of the 3D range sensor which are below a horizon.

10. The method of claim 8, wherein,
the at least one neighboring point for each of the plurality of points is pre-computed prior to the controller receiving the range measurement.

11. The method of claim 8, further comprising:
determining, for each point of the plurality of points, that one or more of the plurality of points correspond to at least one hole if the point is below a third value, the third value corresponds to a height below a plane of the map;
back-projecting the hole points along a path of a beam used to localize the corresponding hole points, the back projection goes until a point where the beam intersects the map plane; and
rasterizing the back-projected hole point as a pixel on the map, the pixel on the map is at the point where the beam intersects the map plane, wherein
the hole pixel prevents navigation thereon by the robotic system.

12. The method of claim 8, further comprising:
determining pixels which lie between a given point and the 3D range sensor; and
rasterizing the pixels which lie between the given point and the 3D range sensor as free space, wherein the rasterizing configures the robotic system to plan a path therein.

13. The method of claim 8, further comprising:
determining, for each point of the plurality of points, that one or more of the points correspond to a navigable ramp based upon (i) the magnitude of a vertical difference between the point and the at least one neighboring point being less than the first value, and (ii) the magnitude of the vertical slope between the point and the at least one neighboring point is less than the second value; and
rasterizing each point determined to represent the navigable ramp as a ramp pixel on the map, wherein the rasterizing configures the robotic system to permit navigation thereon.

14. The method of claim 13, further comprising:
applying a transformation to data from the 3D range sensor based upon the vertical slope of the ramp when navigating the robotic system onto the ramp.

15. A non-transitory computer readable medium comprising computer readable instructions stored thereon that when executed by at least one controller configure the at least one controller to,
receive a range measurement from a three-dimensional ("3D") range sensor, the range measurement comprises of a plurality of points, each of the plurality of points comprises at least one neighboring point;
determine, for each point of the plurality of points, that one or more of the points correspond to a cliff based upon at least one of (i) a magnitude of a vertical difference between the point and the at least one neighboring point being greater than a first value, and (ii) a magnitude of a vertical slope between the point and the at least one neighboring point is greater than a second value; and
rasterize each point determined to represent the cliff into a pixel on a map to cause the robotic system to avoid the pixels on the map representing the cliff.

16. The non-transitory computer readable medium comprising of claim 15, wherein,
the plurality of points comprise a subset of all points generated by the 3D range sensor, and
the subset corresponds to a portion of all points generated by beams of the 3D range sensor which are below a horizon.

17. The non-transitory computer readable medium comprising of claim 15, wherein,
the at least one neighboring point for each of the plurality of points is pre-computed prior to the controller receiving the range measurement.

18. The non-transitory computer readable medium comprising claim 15, wherein the at least one controller is further configured to execute the computer readable instructions to,
determine, for each point of the plurality of points, that one or more of the plurality of points correspond to at least one hole if the point is below a third value, the third value corresponds to a height below a plane of the map;
back-project the hole points along a path of a beam used to localize the corresponding hole points, the back projection goes until a point where the beam intersects the map plane; and
rasterize the back-projected hole point as a pixel on the map, the pixel on the map is at the point where the beam intersects the map plane, wherein
the hole pixel prevents navigation thereon by the robotic system.

19. The non-transitory computer readable medium comprising claim 15, wherein the at least one controller is further configured to execute the computer readable instructions to,
determine pixels which lie between a given point and the 3D range sensor; and
rasterize the pixels which lie between the given point and the 3D range sensor as free space, wherein the rasterizing configures the robotic system to plan a path therein.

20. The non-transitory computer readable medium comprising claim 15, wherein the at least one controller is further configured to execute the computer readable instructions to, determine, for each point of the plurality of points, that one or more of the points correspond to a navigable ramp based upon (i) the magnitude of a vertical difference between the point and the at least one neighboring point being less than the first value, and (ii) the magnitude of the vertical slope between the point and the at least one neighboring point is less than the second value; and rasterize each point determined to represent the navigable ramp as a ramp pixel on the map, wherein the rasterizing configures the robotic system to permit navigation thereon.

\* \* \* \* \*